Dec. 22, 1953  A. R. PHELPS  2,663,439
TELESCOPIC DUMPING TRUCK
Filed Nov. 28, 1950  4 Sheets-Sheet 1

INVENTOR.
Arthur R. Phelps
BY
Atty.

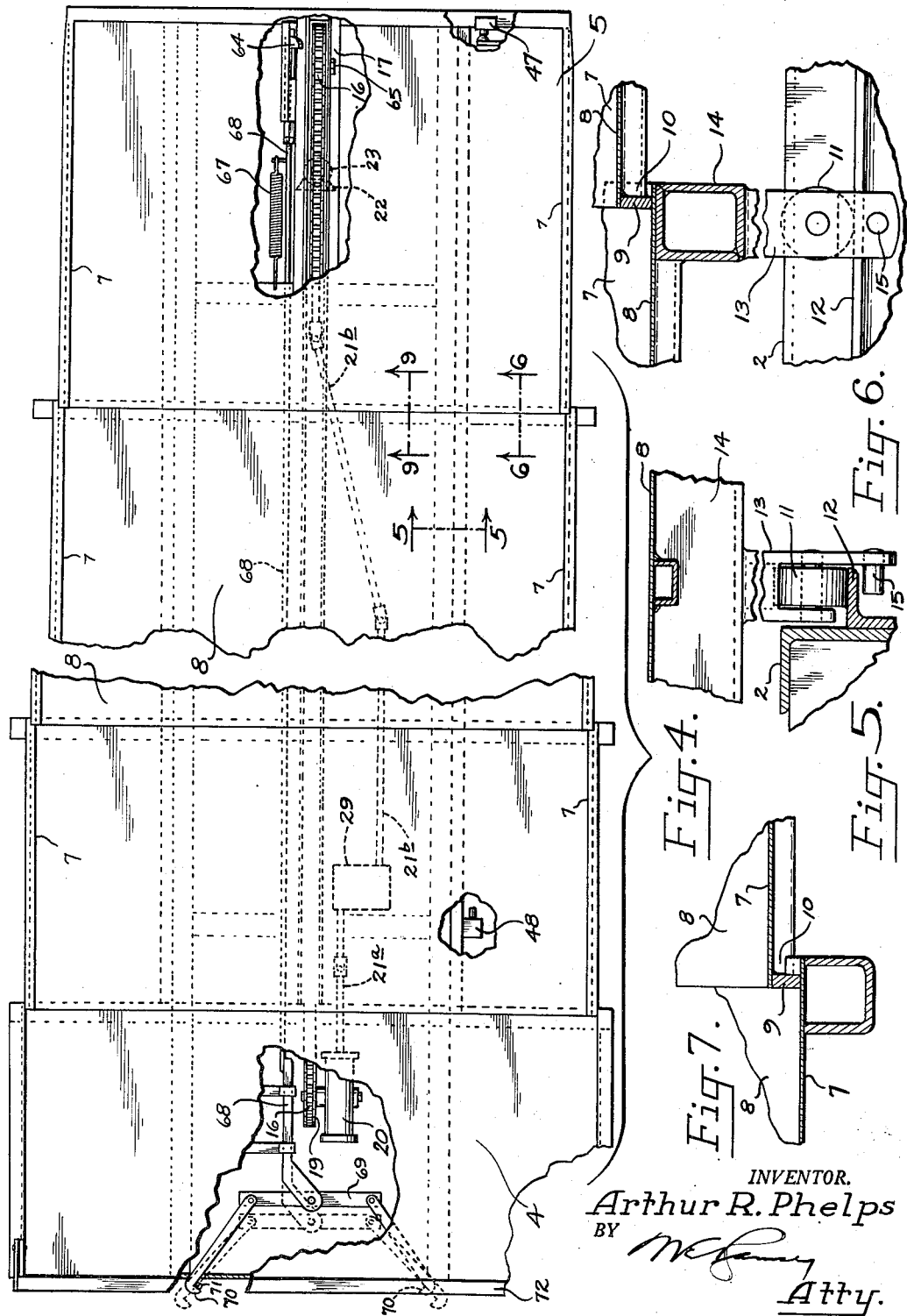

Dec. 22, 1953  A. R. PHELPS  2,663,439
TELESCOPIC DUMPING TRUCK
Filed Nov. 28, 1950  4 Sheets-Sheet 3
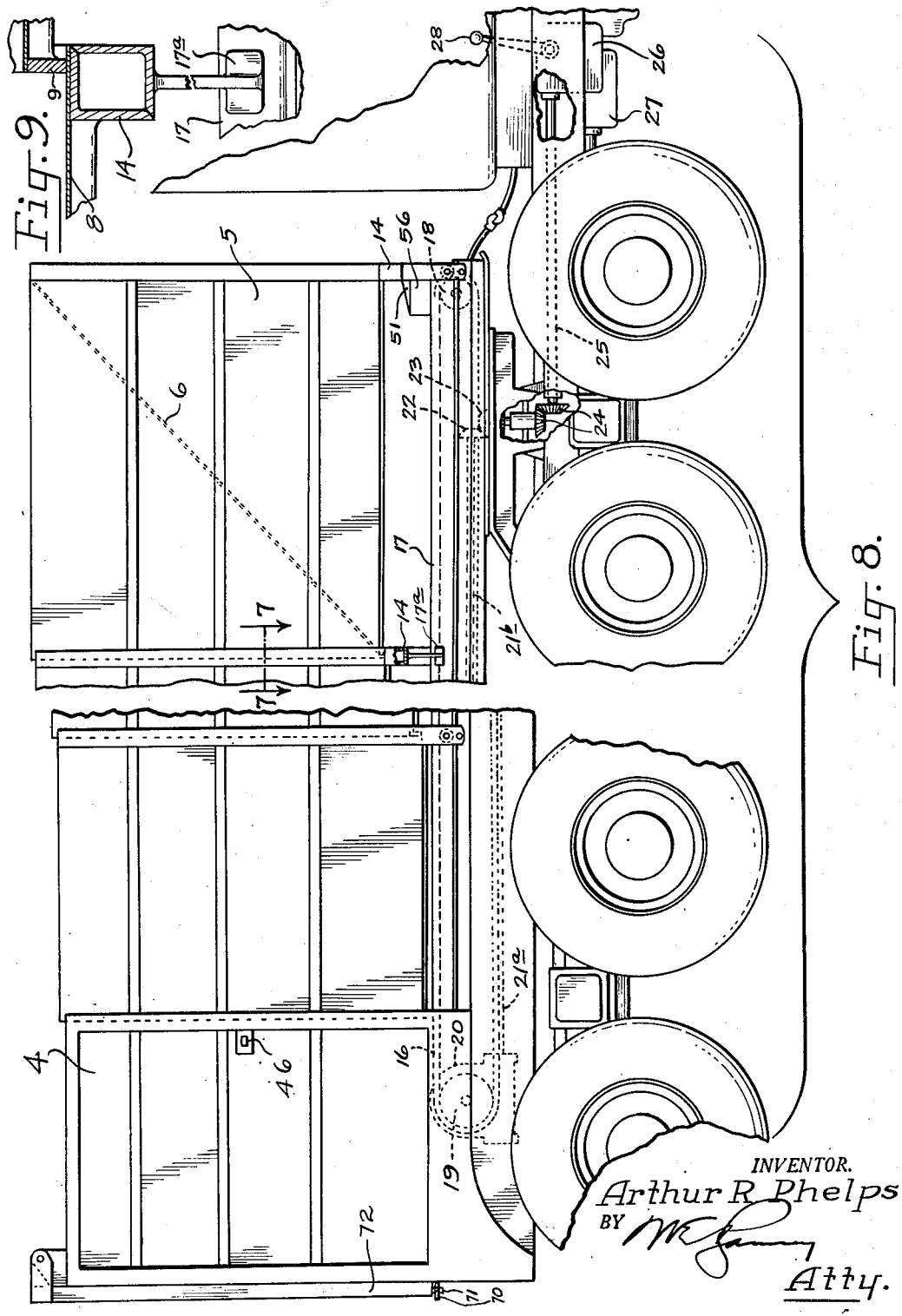

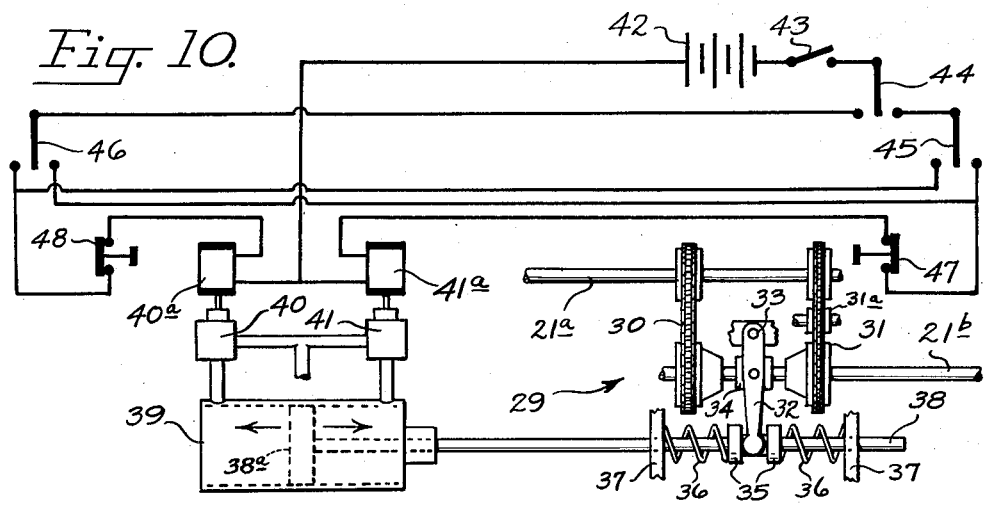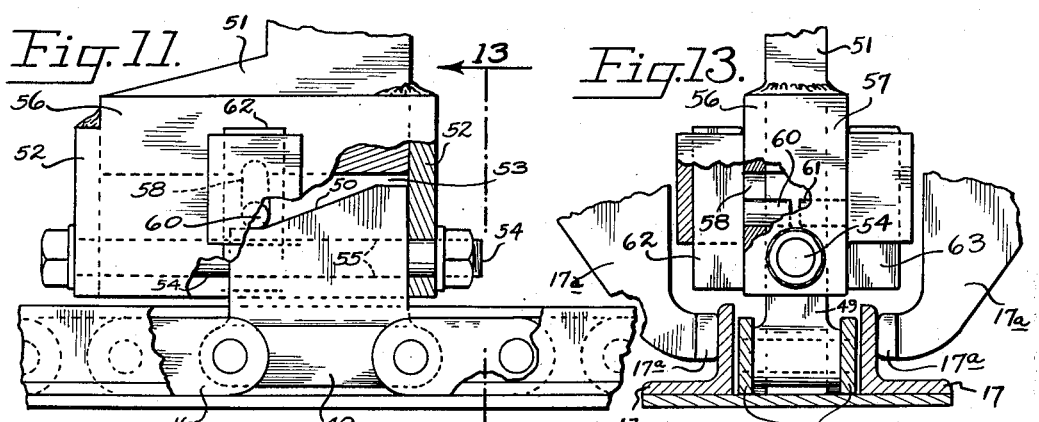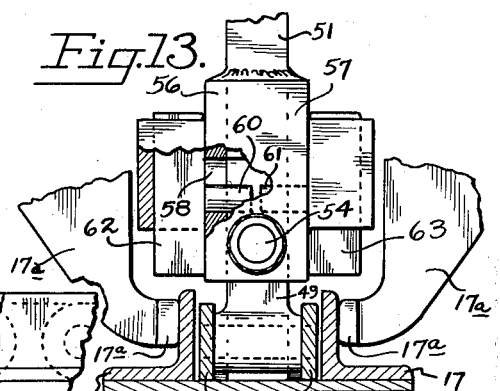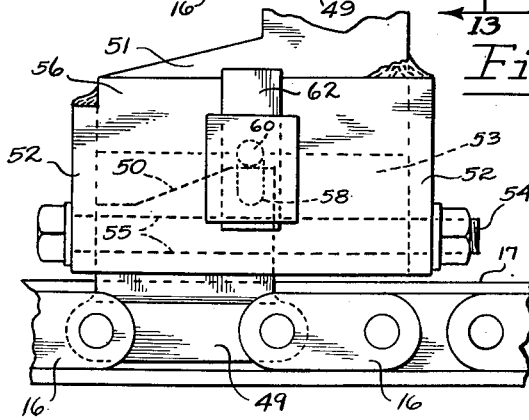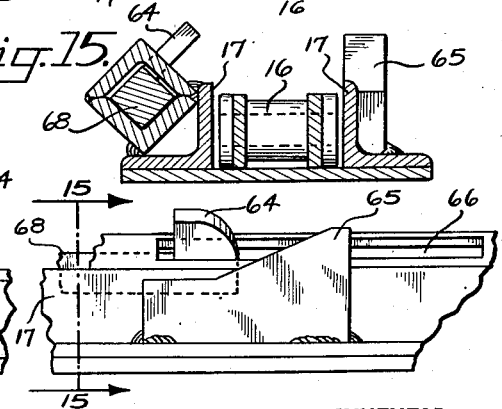

Patented Dec. 22, 1953

2,663,439

UNITED STATES PATENT OFFICE 2,663,439

TELESCOPIC DUMPING TRUCK

Arthur R. Phelps, Portland, Oreg.

Application November 28, 1950, Serial No. 197,880

7 Claims. (Cl. 214—83.24)

This invention relates to a telescopic dump truck and has, as one object thereof, the provision of an aligned center guide and center drive actuation means whereby the telescopic sections of the dump body will nest progressively in the desired sequence without canting, yawing, or sticking.

For many types of hauling, the telescopic dump truck long has been recognized as possessing a decided superiority over the conventional pivoted dump truck. This superiority stems from many factors, among which may be included the following: (1) With similar volume carrying capacities, a much lighter construction can be utilized in the telescopic body since the dumping operation involves a longitudinal carrying of the load rather than a pivotal lifting thereof. (2) Because of their simple operation and lightweight construction, much larger telescopic bodies are feasible. Thus, a given volume load will require fewer trips. (3) Again, because of the lightweight construction, a telescopic body imposes less strain on the truck's power take-off mechanism during dumping. (4) A telescopic body can discharge into elevated hoppers and troughs since the discharge end is maintained level during dumping. (5) Since the load need only fall over the back of each telescopic section progressively rather than slide down the inclined length of the entire body, a nicer control of the dumping operation is possible. This is not to imply, however, that the conventional telescopic dump truck is entirely free from all functional disadvantages, for it is not. In fact, I have come to recognize these disadvantages and my inventive efforts have been turned toward a correction thereof in a manner now to be described.

The conventional telescopic dump body includes a plurality of similarly shaped body sections, arranged one in front of the other in order of decreasing cross section, and mounted on a truck or trailer chassis. Usually, the back section carries a tail gate and is fixed to the chassis whereas the other sections are mounted for longitudinal movement into and out of a nesting relationship. Thus, when a load is to be dumped, the forward sections move rearwardly in unison with each section carrying a fractional portion of the total load. As the sections nest, one by one, these fractional load portions are discharged out the tail gate opening. This serves to point up one of the prime essentials of all telescopic bodies. Thus, it is of particular importance that the various body sections nest with one another in a progressive sequence which is free from sticking, wedging, and canting. Furthermore, the sequential nesting must always take place so that each section is completely telescoped before the section just forward thereof begins to telescope. This requirement will be explained with reference to an example.

Assume, for a moment, that a telescopic body is loaded with a lightweight aggregate, dry sawdust, grain or some other light, bulky cargo. Further assume that one of the middle body sections sticks, cants, or otherwise refuses to nest before the next forward section begins to nest. Obviously, that portion of the load which is carried forward of the immobile middle section will push on and tend to compress the load in the middle section. As the telescopic operation continues, the light, bulky cargo will begin to hump up and, eventually, a portion thereof will spill up and over the sides of the body. If, on the other hand, none of the sections stick or wedge and the sequential nesting progresses as desired, the rear section will discharge; then the next section in front thereof will nest and discharge; and, eventually, the most forward section will nest and discharge; all without spilling or compressing the load.

Various patentees in the telescopic dump truck art have recognized this prime requirement and have made provision therefor. For example, one such typical provision (see U. S. Patent 1,794,318) utilizes a series of latch bars which lock each movable section in the expanded position. Thus, each section is made integral with the section immediately in back thereof. When a load is to be dumped, the rearmost latch bar must first be unlatched or unlocked. Thereafter, and sequentially, the second section nests in the rear section; the third section is unlatched; the third section nests; the fourth section is unlatched; and so forth. This type of sequential nesting is termed "positive lock" because each body section must telescope fully before the next forward section is unlatched. No spilling is possible with a "positive lock" mechanism because, should one section stick or cant, the entire mechanism is rendered immobile.

I have become dissatisfied with "positive lock" mechanisms and have turned my inventive efforts toward a different solution to the sequential, non-sticking problem. In so doing, I have found there are a number of factors which cause a telescopic body to cant, wedge, bind, or otherwise deviate from the desired nesting sequence. These factors include: (1) Loose material such as pieces of rock and particles of sand or grain tend to lodge between the bottom and side walls of adjacent nesting sections. These inhibit free movement of the sections over one another and are cumulative in their effect—each load adding more particles. Consequently, a periodic cleaning of the nesting structure is required. (2) The conventional telescopic body is actuated by twin chains, cables, or hydraulic mechanisms located one on each side of the body sections. This is a disadvantage since, should one side of a section move slightly faster or further than the other side, a cant or yaw takes place and that particular section tends to bind and hang up. (3) The conventional telescopic body moves on twin guides disposed down the sides of the truck or trailer chassis. These guides serve to inhibit lateral movement of the sections. They are, however, less efficient than one central guide. Thus, any off-center loading or any canting of a section tends to cause a bind on two spaced side guides whereas one central guide eliminates this disadvantage. (4) Similarly, the conventional telescopic body is fabricated from lightweight metals such as relatively thin sheet steel. Repeated use may bend or warp such thin sections. If two guides are utilized, any change in the lateral dimension of a section will cause it to stick or wedge. If, however, one central guide is utilized, such dimension changes leave the telescopic movement uninhibited.

Having set forth those factors which cause the conventional telescopic body to cant, wedge, bind, or otherwise deviate from the desired nesting sequence, I shall now set forth the various structural details with which I overcome these factors and disadvantages. These structural details, then, stem directly from my inventive efforts to provide a novel and different solution to the sequential nesting problem. They are in direct contrast to the "positive-lock" solution. Accordingly, they also define the objects of my invention. (1) I have secured a peripheral skirt about the walls and bottom of each body section. This skirt slidably engages and serves to space companion nesting sections, to define therebetween a chamber. Thus, when loose material tends to lodge between companion sections, it is collected in this chamber, and when next the body is extended, the skirt sweeps the chamber clean. (2) I utilize but one central guide to provide against lateral movement and to guide the longitudinal movement of these sections. This is of definite utility in inhibiting binding and canting or yawing. (3) I provide but one central actuation means and the push thereon is axially aligned with the central guide. Such actuation is cumulative with the guide function in inhibiting binding and wedging. (4) I provide against inadvertent nesting, as when an empty truck is returning to pick up a load, by positively locking both the tail gate and the telescopic sections against longitudinal movement. (5) I correlate the rate of nesting of the sections to the ground speed of the truck by driving the actuation mechanism from the truck transmission. Thus, when bituminous concrete or other material is to be spread over a large area, the desired coat thickness can be regulated by adjusting the ground speed of the truck and the rate of nesting or dumping simultaneously.

These and other objects and advantages of my invention will be hereinafter set forth in the following detailed description taken in conjunction with the accompanying drawings, in which:

Figs. 1, 2, and 3 are related perspective views showing a typical telescopic dumping operation as effected by my invention;

Fig. 4 is a top view, partially broken away and foreshortened, showing the tail gate latch and a portion of the actuation mechanism for telescoping and extending the various sections of my telescopic body;

Fig. 5 is a broken detail view, taken substantially on the line 5—5 of Fig. 4, showing one of the track supported rollers which carry the forward end of each telescopic body section;

Fig. 6 is a broken detail view, taken substantially on the line 6—6 of Fig. 4, showing a side view of one of the rollers and also showing a portion of the peripheral skirt which extends about the rear of each movable body section;

Fig. 7 is another broken section view, taken substantially on the line 7—7 of Fig. 8, showing that portion of the peripheral skirt which slidably engages the side wall of the telescopic section companion thereto;

Fig. 8 is a side view, partially broken away and foreshortened, showing my telescopic body and a portion of the actuation mechanism therefor whereby the conventional truck transmission is operatively joined to my actuation mechanism to correlate the rate of nesting to the vehicle ground speed when desired;

Fig. 9 is a broken section view, taken substantially on the line 9—9 of Fig. 4, showing one of the sliding shoes which is an integral part of my medial guide means for restricting lateral movement of each body section;

Fig. 10 is a schematic wiring diagram also showing a portion of my actuation mechanism and indicating diagrammatically the structure by which I control the nesting and extending of my telescopic body;

Figs. 11 and 12 are related side views, partially broken away, indicating the two operative positions of the cam-faced shoe which automatically unlocks the tail gate and releases the telescopic sections just prior to the start of a nesting operation;

Fig. 13 is a detail view, partially broken away, and taken substantially on the line 13—13 of Fig. 11, and more particularly indicating the slidable shoes which form an integral part of the guide means for restricting lateral movement of the telescopic sections;

Fig. 14 is a broken detail view showing the tail gate catch and the body section lock block of my invention; and Fig. 15 is a detail view, taken substantially on the line 15—15 of Fig. 14, more particularly indicating the relationship of the tail gate catch and the lock block to the endless chain by means of which I actuate my telescopic body.

Figure 1:
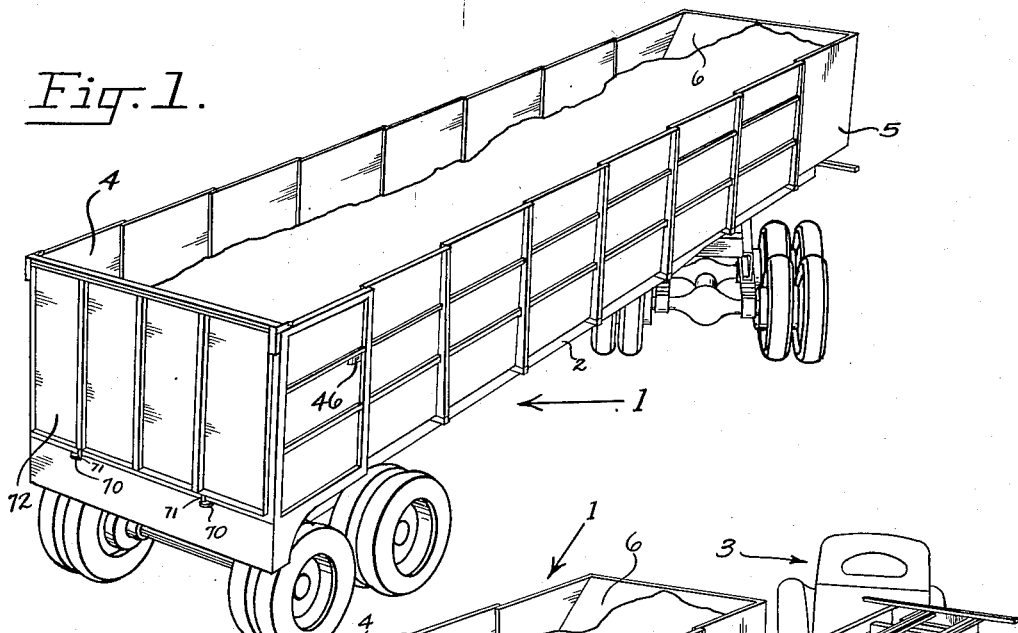
Figure 2:
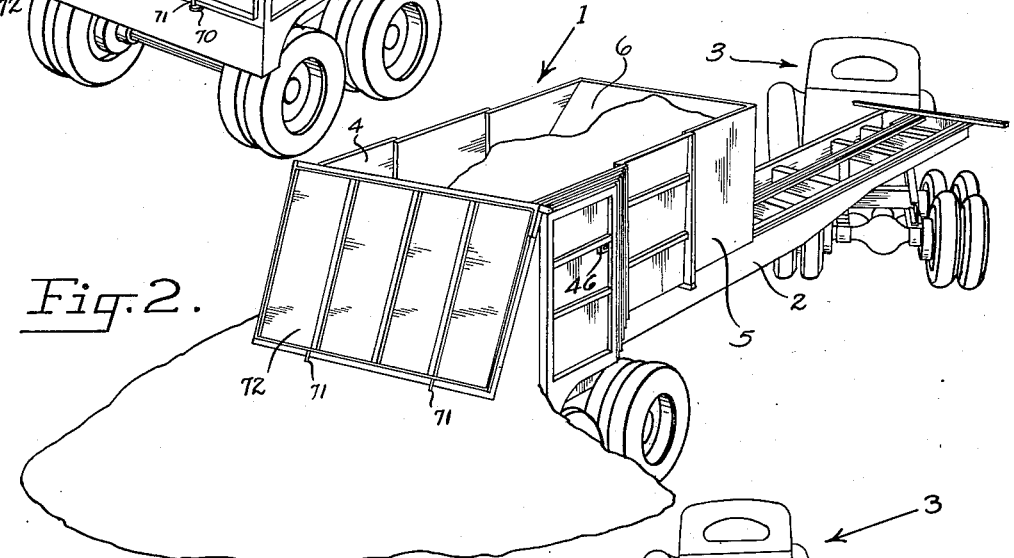
Figure 3:
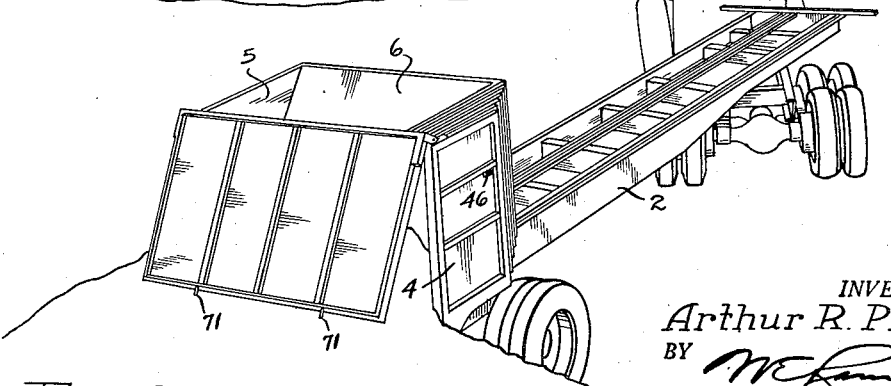

In Figs. 1, 2, and 3, I have shown my telescopic body 1 mounted on a trailer chassis 2 pulled by tractor 3. These figures indicate sequentially three steps in a typical dumping operation. They also show that the rearmost body section 4 is fixed to the trailer chassis 2, whereas all body sections forward thereof are longitudinally movable. Furthermore, in order to completely empty the most forward body section 5, I have disposed therein an oblique floor 6. This oblique floor 6 extends from the top front to the bottom rear of the forward body section 5 and is disposed at an angle of substantially 45°. I deem this angle of substantially 45° (see Fig. 8) to be of critical importance since this is the angle of repose of moist but not wet sand. Such sand possesses the maximum angle of repose of all those materials commonly to be carried by my telescopic body.

Progressing from the rear to the front of the body 1, it will be noted that the various sections thereof are of complementary shape but of decreasing size. Thus, the rearmost body section 4 is the deepest and widest of all sections whereas the front section 5 is the least deep but is the longest of all sections. This tapered disposition of the body sections is necessary to a correct nesting or telescoping function. Furthermore, each section must be somewhat longer than its next rearward mate since, when the body is completely telescoped as shown in Fig. 3, the rear faces of all sections must be in vertical alignment to completely empty the body.

Progressing now to Figs. 4, 6, and 7, I have therein shown, in enlarged detail, those elements which are in operative contact between adjacent body sections. Thus, each body section has two side walls 7 joined by a bottom wall 8. Fig. 4 would appear to indicate that the bottoms and walls of adjacent members actually contact one another. This, however, is not the case. Rather, I secure a peripheral skirt 9 about the bottom 8 and side walls 7 of each section. This peripheral skirt is perpendicular to the respective walls and is in sliding contact with the inner surfaces of the next adjacent section. For example, Fig. 6 indicates the manner in which the peripheral skirt 9 spaces two adjoining bottom members 8 and Fig. 7 indicates the manner in which the skirt spaces two adjacent side walls 7.

As best shown in Figs. 6 and 7, the spacing provided by the peripheral skirt 9 defines a chamber 10. This chamber is U-shaped since it extends about the three sided periphery of each body section. Furthermore, since the skirt 9 moves during each telescopic nesting of the body sections, the chamber 10 is expansible yet the front side thereof is open. I deem this chamber to be of critical importance since, should material lodge therein during a nesting of the body sections, (such inadvertent lodging is almost impossible to prevent) the peripheral skirt 9 acts as a scraping lip to clean the chamber. The conventional telescopic body fails to provide such an open-faced chamber and, when loose material such as pieces of rock or particles of sand or grain lodge between the bottom and side walls of adjcent nesting sections, the free movement of the sections over one another is inhibited. Furthermore, this loose material accumulates as load after load is dumped. If the driver fails to clean the body, the accumulation may render the nesting structure inoperative. With my self-cleaning chamber, however, material does not so accumulate and repeated use with little or no attention is possible.

Each section of my telescopic body is supported at the rear thereof by the aforementioned peripheral skirt 9 and at the front thereof by two spaced rollers 11 which ride on angle iron tracks 12. The rollers 11 are journaled in a U-shaped member 13 pendent from a main cross frame 14. The U-shaped member 13, in turn, carries a safety catch pin 15 disposed below the track 12. During operation, the various rollers 11 cooperate to carry most of the weight of the load in each body section and the catch pins 15 function only if a section tips inadvertently. Furthermore, the pins 15 and member 13 are spaced laterally from the chassis proper so as never to make contact therewith. In other words, this structure does not guide the sections to inhibit lateral movement; it merely carries the load. In this manner, I allow for a slight lateral dimensional change in each section. When it is remembered that telescopic bodies are constructed from relatively thin sheet metal and are subject to repeated bending stresses, the importance of this lateral spacing becomes apparent.

The various sections of my telescopic body are nested and extended by an actuation mechanism which includes an endless chain 16 or a similar cable, wire, rope, etc. Whichever structure is utilized, I prefer to dispose the same longitudinally down the center of the tractor chassis 2. To this end, two angle iron guides 17 are secured to the tractor chassis in spaced relationship (see Fig. 13). The chain, cable, or the like rides between these guides and is reaved over two spaced sprockets 18 and 19 journaled under the front section 5 and rear section 4, respectively. The sprocket 18 is an idler sprocket and the sprocket 19 is a drive sprocket.

The angle iron guides 17 serve yet another function. Thus, a pair of shoes 17a slidably contact the outer faces of the guides 17. This sliding contact should be contrasted with the spaced relationship of the side roller structure. The shoes 17a are pendent from the aforementioned main cross frame 14 and a pair of shoes are associated with each telescopic section to carry the front of the same. The guides 17 and shoes 17a, together, define a central guide inhibiting lateral movement and guiding the longitudinal movement of the telescopic body. Thus, as heretofore pointed out, one central guide is far superior to two spaced side guides since the former will serve to inhibit canting and yawing without binding or catching during actuation.

Returning now to the drive sprocket 19, rotary motion is transmitted thereto through a worm gear encased within a housing 20 (see Fig. 4). The worm gear, in turn, is driven by an articulated shaft 21a. This shaft 21a is driven by a second articulated shaft 21b through a chain reversing mechanism housed within the box 29. Turning now to Fig. 8, a bevel gear 22 drives the shaft 21b and, in turn, is meshed with a similar bevel gear 23. The gear 23 is journaled in the chassis and derives rotation from two more similar bevel gears 24. The second of these latter gears is keyed to a main drive shaft 25.

In the right hand portion of Fig. 8, I have shown a housing 26 slightly forward of and to the side of the conventional truck selective speed mechanism or transmission housing 27. Furthermore, I have shown an operating handle 28 for engaging and disengaging the mechanism within the housing 26 and I have indicated that the main drive shaft 25 is driven from within this housing. In further explanation, the housing 26 shields the conventional power take-off mechanism so often associated with large trucks and tractors. That is to say, a power take-off shaft engages the tractor power imput shaft within the transmission housing 27. This power take-off shaft drives the gearing within the power take-off mechanism housing 26. Thus, the speed of rotation of the tractor engine is imparted to both the tractor power take-off shaft and the mechanism 26. Furthermore, this structure functions to correlate the speed of rotation of the mechanism 26 to the speed selected to drive the tractor 3 over the ground. The handle 28, on the other hand, will either engage or disengage the main drive shaft 25 with the power take-off mechanism housed in 26. Thus, the drive shaft 25 turns the various bevel gears 22, 23, 24, the two shafts 21a and 21b, and the worm gear 20 to rotate the drive sprocket 19 and turn the chain 16. In short, by driving the chain 16 from the tractor transmission, I have correlated the rate of nesting of the body sections to the vehicle ground speed.

The function of the directional chain mechanism 29 (interposed between the shafts 21a and 21b as per Fig. 4) will now be explained. In Fig. 10, I have shown by schematic diagram that mechanism which is contained within the chain reversing box 29. Thus, the two articulated shafts 21a and 21b are operatively joined across a selected one of a nesting chain and sprocket mechanism 30 and an extending chain and sprocket mechanism 31, 31a, the sprocket 31a representing a reversing sprocket. A selector fork 32 is pivoted at 33 and carries a sleeve 34 which slidably encompasses the articulated shaft 21b. The lower end of the fork 32, in turn, slidably engages the double collar 35 to pivot as the collar moves. The double collar 35 is slidably carried by the piston rod 38 but is constrained for movement therewith by two centering springs 36 which bear on the twin flanges 37. These flanges are secured to the piston rod 38. A double-acting pneumatic motor 39 reciprocates the piston 38a and the piston rod 38. Thus, when the piston 38a shifts to the right in Fig. 10, the selector fork 32 causes the collar 34 to engage the extending chain and sprocket mechanism 31, 31a to rotate the articulated shaft 21a in a direction to extend the telescopic body sections. On the other hand, when the piston 38a moves to the left, the selector fork 32 reverses the position of the collar 34 to engage the nesting chain and sprocket mechanism 30. This movement disengages the mechanism 31, 31a and causes the articulated shaft 21a to rotate in the opposite direction so as to nest the telescopic body sections.

With further reference to Fig. 10, I have indicated schematically the electric wiring diagram and mechanism by means of which I control the reciprocal movements of the double-acting pneumatic motor 39. Thus, I have shown two motor control valves 40 and 41 having spring biased solenoid actuators 40a and 41a, respectively. The motor-control valves supply and exhaust fluid to and from the opposite sides of the piston 38a. Accordingly, the electric wiring must include a battery 42, an ignition switch 43, a selector switch 44, and two limit and two direction switches. The direction switch 45 is located in the cab of the tractor 3 while the direction switch 46 is located on the rear body section 4 as shown in Fig. 8. The two spring biased limit switches 47 and 48, in turn, are located under the bottom wall of the front section 5 and the next to the last section (see Fig. 4) so as to be contacted at the respective extreme limits of a nesting and an extending operation. During an operative cycle of this mechanism and by way of example, the ignition switch 43 is closed, the selector switch 44 is moved either to the right to select a cab actuation station or the left to select the rear section actuation station, and the driver or operator stations himself accordingly. If the rear station has been selected, the driver stands beside the rear section 4 and reaches up to actuate the switch 46. In one position of this switch (to the left), the solenoid 40a will be energized to actuate the control valve 40 and move the piston 38a to the right (see Fig. 10). In the other position of the switch 46, the control valve 41 will be actuated to move the piston 38a to the left. When the telescopic body sections reach one limit of movement, the corresponding limit switch 47 or 48 is opened to break the circuit mated thereto. Thus, when the sections are fully nested, the limit switch 47 is open so the chain reversing mechanism can move only to extend the sections. Similarly, when the body sections are fully extended, the limit switch 48 is open and the mechanism of Fig. 10 is operative only to move the reversing mechanism to the nesting position.

In Figs. 11 to 15, inclusive, I have shown the structure which serves to lock the body sections in extended position. At the same time, this structure serves to latch and unlatch the tail gate 72 which is pivoted on the rear body section 4. To this end, a cam-faced shoe 49 carries a sloping cam face 50 and is secured between two links of the chain 16. A heavy L-bar is welded both to the medial portion of the front section 5 at one of the main cross members 14 and to two plates 52 to thereby define a hollow chamber 53 (see Figs. 8, 11, and 12). The hollow chamber 53 is traversed by an elongated bolt 54 secured, by nuts, to the aforementioned plates 52. The shoe 49, in turn, is pierced by an axial aperture 55 which slidably encompasses the bolt 54 to guide the shoe for longitudinal movement back and forth within the hollow chamber 53. Thus, as the chain 16 moves, the shoe 49 is free to move between the two respective positions shown in Figs. 11 and 12. In the position of Fig. 11, the shoe 49 bears on the right hand plate 52 and the telescopic body sections will move to the extended position. In the position of Fig. 12, the shoe bears in the left hand plate 52 and the telescopic body sections will move to a nested position.

The side walls of the hollow chamber 53 include two plates 56 and 57 having vertical slots 58 and 59, respectively (see Fig. 13). The slots 58 and 59 accommodate the vertical movement of two pins 60 and 61 carrying the reciprocally mounted keepers 62 and 63, respectively. Thus, both of the pins 60 and 61 extend into the hollow chamber 53 for cooperative engagement with the cam face 50. When the shoe 49 moves to the left, these two pins are lifted vertically in their respective slots to lift the keepers 62 and 63 which are secured thereto.

Referring now to Figs. 14 and 15, the function of the keepers 62 and 63 will be explained. The keeper 62 coacts with a catch 64 and the keeper 63 coacts with a lock block 65. When the telescopic body sections are fully extended, the keeper 63 drops down behind the lock block 65 and holds the chain 16 to prevent an inadvertent nesting. Similarly, the catch 64 is constrained for longitudinal movement by means of a slot 66 and is spring biased by the tension spring 67. An elongated rod 68 is secured to the catch 64 and this rod articulates anteriorly with a cross bar 69 (see Fig. 4). The cross bar 69, in turn, carries a pair of catches 70 which cooperate with the pins 71 carried by the aforementioned tail gate 72. As is conventional, the tail gate is pivoted at its upper end so as to swing open when a load is to be dumped (see Figs. 2 and 3).

Returning now to Figs. 14 and 15, as the chain 16 moves to an extending position (to the right in Fig. 14), the keeper 62 engages the catch 64 and moves it longitudinally against the force of the tension spring 67. This movement causes the cross bar 69 and tail gate catches 70 to engage the tail gate pins 71 and lock the tail gate securely in place. Similarly, when the chain 16 moves to nest the telescopic body sections (to the left in Figures 11, 12, and 14), the first two inches or so of travel of the chain do not move the body sections but rather move the shoe 49 from the position of Fig. 11 to that of Fig. 12. During this first two inches of travel, the cam face 50 lifts the pins 60 and 61. The pin 60 allows the keeper 62 to clear the catch 64 and unlock the tail gate catches 70. The pin 61 lifts the keeper 63 vertically to clear the lock block 65.

In the operation of my telescopic dump body, let it be assumed that a coat of bituminous concrete is to be spread over a large area road bed. With the tractor and trailer in position over the road bed and with the tractor engine running, the ignition switch 43 will be closed (see Fig. 10). Accordingly, the driver will move the selector switch 44 to select the cab operating station as defined by the cab switch 45. Thereafter, the handle 28 is moved to place the imput shaft of the selective speed transmission 27 of the truck in operative engagement with the power take-off mechanism 26. This will correlate the rate of nesting of the telescopic sections to the truck ground speed. For example, if a thick coat of bituminous concrete is desired, the driver will place the tractor transmission in compound low so the ground speed of the tractor will be slow. If, however, a thin coat of bituminous concrete is to be spread over the road bed, the driver will place the tractor transmission in second or high so as to increase the ground speed and spread a thinner coat. In either position, the rate of nesting varies directly as the tractor engine rotational velocity.

When the load is ready to be dumped, the driver actuates the direction switch 45 in the cab to move the double-acting motor 39 and the selector 32. Such movement joins the articulated shafts 21a and 21b across the nesting chain and sprocket mechanism 30 to begin the nesting movements of the body sections. Thereafter, as the tractor and trailer proceed over the road bed, the telescopic sections slowly nest and a thin (or thick) uniform coat of bituminous concrete is spread.

Nesting of the telescopic body sections proceeds as follows: The power take-off mechanism housed in 26 rotates the drive shaft 25, the bevel gears 24, the bevel gears 23 and 22, and the articulated shaft 21b (see Fig. 8). The articulated shaft 21b drives the articulated shaft 21a across the nesting chain and sprocket mechanism 30 housed within the chain-reversing box 29 (see Figs. 10 and 4). The articulated shaft 21a rotates the drive sprocket 19 via the worm gear 20 to move the chain 16 to the left in Figs. 11 and 12. During the first two inches or so of travel, the shoe 49 slides over the bolt 54 and the cam face 50 engages the pins 60 and 61. These pins lift the keepers 62 and 63 to perform two functions. The first function is to unlock the telescopic sections by clearing the keeper 63 over the lock block 65. The second function is to release the catch 64 to unlatch the tail gate catches 70. Thus, the tail gate is unlocked and the body sections nest, sequentially, as the left end of the shoe 49 contacts the left end plate 52.

The medial push of the shoe 49 on the left end plate 52 moves the front section 5 to the left (see Fig. 8) by means of the L-bar 51. Thus, the medial under portion of the front section is pushed rearwardly and, due to the relatively friction-free sliding contact of the nested body sections, the rearmost movable section begins to nest in the fixed rear section 4. As this nesting takes place, the load carried by the section 4 begins to spill out through the tail gate 72 (see Fig. 2). In sequence, the various body sections nest in one another until the front section 5 is completely telescoped as shown in Fig. 3. At that time, the front section 5 empties completely due to the oblique disposition of the floor 6. It will be remembered that this floor is disposed at an angle exceeding the angle of repose of the material to be hauled. I have found that an angle of substantially 45° will serve this purpose.

While I have selected a spreading operation to demonstrate one typical sequential operation of my telescopic dump body, it will be obvious that a load can just as easily be dumped while the tractor is at rest. Thus, a majority of dumping operations do not include a simultaneous spreading of the load. Rather, the tractor and trailer are stationed adjacent a dump area and the load is dumped in a single mound or pile as shown in Figures 1, 2 and 3. Such an operation differs from the aforementioned spreading operation only in that the tractor transmission is placed in neutral. Thereafter, the telescopic body sections will nest, sequentially, as has been described but the tractor will remain at rest.

It is further to be noted and in accord with the objects of my invention, I have provided the peripheral skirt 9 extending about the rear of each telescopic section. This skirt is in sliding contact with the section companion thereto and serves to space the bottom and side walls of the companion sections to define the aforementioned chamber 10. This chamber, it will be remembered, renders my telescopic body self-cleaning to sweep out any material which may accumulate between the walls of the companion sections. Furthermore, I have guided the longitudinal movement of my telescopic sections and have inhibited the lateral movement thereof with but one central guide. This guide I have aligned with the actuation mechanism so as to materially reduce any chance of canting or yawing during a telescopic operation. Thus, I have solved the sequential non-sticking problem without resorting to a "positive lock" mechanism. The cumulative effect of these novel structures is to correct the aforementioned disadvantages of the conventional telescopic dump body while, at the same time, preserving and amplifying those factors which make the telescopic body superior to the conventional pivoted body.

I claim:

1. In combination with a motor vehicle having a selective speed transmission and carrying a plurality of telescopic dump body sections mounted for longitudinal movement into a nested relationship, a tail gate movably mounted upon the rearmost body section and having a catch means selectively for latching and unlatching the same, and actuation means engageable serially with said catch and with the most forward body section to unlatch said tail gate and nest said body sections, sequentially, said actuation means being operatively joined to and driven by said selective speed transmission to correlate the rate of nesting to the vehicle ground speed when desired.

2. In combination with a motor vehicle having a selective speed transmission and carrying a plurality of telescopic dump body sections mounted for longitudinal movement into a nested relationship, a locking tail gate movably mounted upon the rearmost body section, catch means spring biased to a release position and movable to a latch position in which said tail gate is locked, guide means engaging the medial under side of said body sections to guide the longitudinal movement and restrict the lateral movement thereof, and actuation means including a cam faced shoe operatively movable to release said catch means and thereafter to engage the most forward body section to release said tail gate and nest said body sections, sequentially, said actuation means being operatively joined to and driven by said selective speed transmission to correlate the rate of nesting to the vehicle ground speed when desired.

3. A dump body, comprising a plurality of telescopic body sections, longitudinally movable into a nested relationship, a skirt secured about the periphery of each said section in slidable engagement with the body section telescopically companion thereto, said skirt serving to space the walls of adjacent body sections and to define therewith a chamber, the side of said chamber opposite said skirt being open to discharge material therethrough in cooperation with the slidable engagement of said lip when said body is extended, and actuation means engaging the medial portion of the most forward of said movable body sections to move said dump body, selectively, to a nested or an extended position.

4. A telescopic dump body, comprising a plurality of complementary body sections of which one is fixed and the others are longitudinally movable to nest therein, each said section having two side walls joined by a bottom member, and a skirt secured about the periphery of each said movable section in slidable engagement with the body section telescopically companion thereto, said skirt serving to space the bottom and side walls of adjacent body sections and to define therewith a chamber, the side of said chamber opposite said skirt being open to discharge material therethrough in cooperation with the slidable engagement of said skirt when said body is extended.

5. A telescopic dump body, comprising a plurality of complementary body sections of which one is fixed and the others are longitudinally movable to nest therein, each said section having two side walls joined by a bottom member, a single peripheral skirt secured about the side walls and bottom of each said movable section in slidable engagement with the inner faces of the bottom and side walls telescopically companion thereto, said skirt serving to space the walls of adjacent body sections and to define therewith an expansible U-shaped chamber; and actuation means engaging the medial portion of the most forward of said movable body sections to move said dump body, selectively, to a nested or an extended position.

6. In combination with a motor vehicle having a plurality of telescopic dump body sections which are mounted for sequential longitudinal movement to and from a nested relationship, a movable tail gate mounted pivotally upon the rearmost telescopic dump body section, catch means movable selectively to latch and to unlatch said tail gate, locking means engageable with one of said dump body sections and movable to lock and to unlock the body sections, and actuation means including a shoe simultaneously operable upon said catch means and locking means to unlatch the tail gate and unlock the body sections, said actuation means shoe thereafter and in sequence being engageable with the most forward telescopic dump body section to move the same toward nested relationship.

7. In combination with a motor driven truck having a selective speed transmission and carrying a plurality of telescopic dump body sections which are mounted for movement longitudinally of the truck to and from a nested relationship, a movable tail gate mounted pivotally upon the rearmost telescopic dump body section, catch means movable selectively to latch and to unlatch said tail gate, locking means movable to lock and to unlock said body sections, and actuation means including a shoe simultaneously operable upon said catch means and locking means to unlatch the tail gate and unlock the body sections, said actuation means shoe thereafter and in sequence being engageable with the most forward telescopic dump body section to move the same toward nested relationship, said actuation means being geared to and driven by said selective speed transmission to correlate the rate of nesting of the body sections to the ground speed of the truck when desired.

ARTHUR R. PHELPS.

References Cited in the file of this patent

UNITED STATES PATENTS

| Number | Name | Date |
|---|---|---|
| 1,353,229 | Georgeson | Sept. 21, 1920 |
| 1,794,318 | Perkins et al. | Feb. 24, 1931 |
| 1,891,885 | Tapp et al. | Dec. 20, 1932 |
| 1,966,710 | Claybaker | July 17, 1934 |
| 2,047,602 | Tomlinson | July 14, 1936 |
| 2,258,988 | Le Laurin | Oct. 14, 1941 |
| 2,295,934 | Clark | Sept. 15, 1942 |
| 2,493,236 | Dunstan | Jan. 3, 1950 |
| 2,494,013 | Tapp | Jan. 10, 1950 |